Aug. 18, 1959     G. W. WEBB     2,899,757
ADD-UP BLOCK TOY FOR TEACHING ARITHMETIC
Filed Dec. 30, 1957
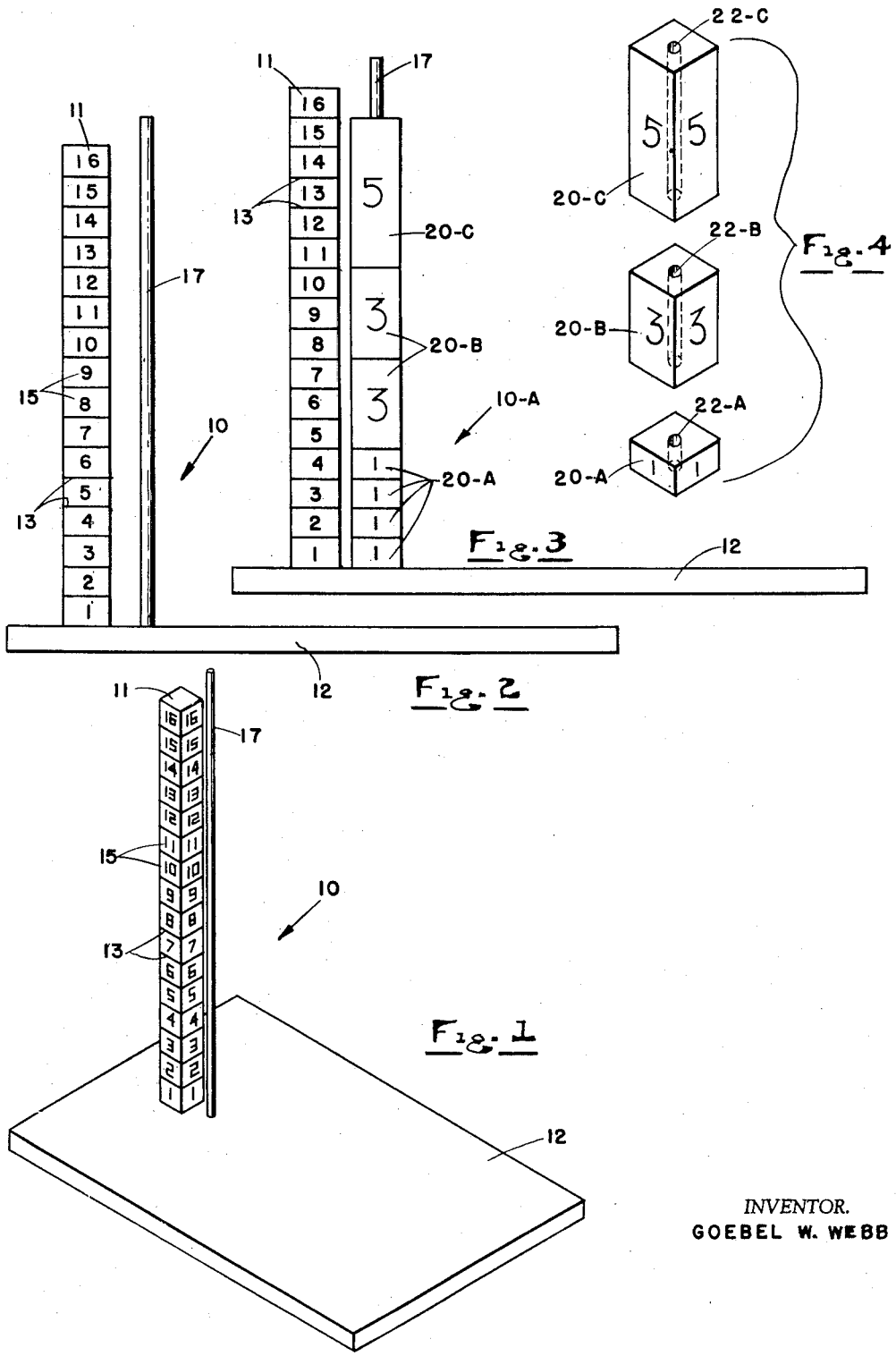
INVENTOR.
GOEBEL W. WEBB

United States Patent Office 2,899,757
Patented Aug. 18, 1959

2,899,757

ADD-UP BLOCK TOY FOR TEACHING ARITHMETIC

Goebel William Webb, Bowling Green, Ky.

Application December 30, 1957, Serial No. 706,128

2 Claims. (Cl. 35—32)

This invention relates to amusement devices and more particularly to an educational toy.

It is an object of the present invention to provide an entertaining and amusing educational toy for teaching simple addition in a simple and enjoyable manner.

Another object of the present invention is to provide a visual aid demonstration device for teaching simple arithmetic that will provide a visual picture of the addition and subtraction of small numbers.

Other objects of the invention are to provide an educational toy bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a perspective view of a toy made in accordance with the present invention;

Figure 2 is a side elevational view of the device shown in Figure 1;

Figure 3 is a view similar to Figure 2, showing the toy in operative use; and

Figure 4 is an exploded perspective view of certain parts of the present invention.

Referring now more in detail to the drawing, an educational toy 10 made in accordance with the present invention is shown to include a base 12 having a vertical column 11 supported adjacent to one end thereof. This column 11 is preferably of rectangular cross sectional configuration and is divided into a plurality of identical sections by circumferentially extending lines 13 which are longitudinally equally spaced apart. Each defined section of the column is provided with identifying indicia 15 in the form of a number arranged in predetermined series relationship. Commencing with unity at the bottom of the column, each subsequent higher section is consecutively numbered up to the top of the column which may be of any desired height, such as sixteen units illustrated in the drawing. A circular rod 17 is also supported upon the base 12 in parallel spaced apart relationship with the column 11. This rod 17 slidably supports any number of selected blocks 20a, b, c that are provided with longitudinal bores 22a, b, c, respectively. The standard size block 20a has a height equal to the distance between adjacent lines 13 on the column and is so identified by the numeral "1." The other blocks 20b, c are of a height corresponding to equal multiples of the height of the standard block 20a and are so identified by the numerals "3" and "5," respectively.

The manner of operation of this toy will now become apparent. The blocks may now be placed either at random or in predetermined order upon the rod 17, such as shown in Figure 3, whereby the upper edge of the topmost block will coincide with one of the lines 13 on the column 11 to automatically give the total of the values of all of the blocks. For example, by arranging four standard blocks 20a, two triple blocks 20b, and one five unit block 20c, the upper edge of the top block will indicate a total of "15" on the column 11. In a similar manner, this game may also be used for instructions on subtraction, and thus provide a simple and practical visual aid for children of various age groups, and may be used as a simple toy by infants until they reach the age at which they can learn this simple arithmetic.

While various changes may be made in the detail construction, it shall be understood that such changes shall be within the spirit and scope of the present invention as defined by the appended claims.

What I claim as new and desire to protect by Letters Patent of the United States is:

1. In a device for teaching arithmetic, a base of rectangular configuration, a vertical column of rectangular configuration rigidly secured adjacent one end of said base and upon the upper surface thereof, said column divided into a plurality of identical sections by circumferentially extending lines which are longitudinally equally spaced apart and in planes parallel with said upper surface of said base, a circular rod rigidly secured upon said base in parallel spaced apart relation from and with said vertical column, and a number of rectangular blocks, said blocks provided with longitudinal bores centrally located therethrough for positioning same upon said circular rod and adjacent said vertical column, said sections on said column are marked to represent a series of denominations, a number is positioned in each section to represent a particular denomination, said blocks being numbered and of lengths corresponding to integral multiples of said sections on said column and a number corresponding to the number of the block, whereby when said blocks are arranged on said circular rod adjacent said vertical column, the total height of the column of blocks being indicated by the number on said vertical column and the circumferential line thereon adjacent the upper end of said column of blocks.

2. The combination according to claim 1 wherein said series of denominations on said vertical column comprises a series of numbers commencing with unity adjacent with said base and arranged in consecutive order upwardly throughout the length of the vertical column.

References Cited in the file of this patent

UNITED STATES PATENTS

| | | |
|---|---|---|
| 2,494,469 | Booth | Jan. 10, 1950 |
| 2,494,497 | Trapnell | Jan. 10, 1950 |
| 2,564,976 | Hooper | Aug. 21, 1951 |
| 2,876,560 | Henley | Mar. 10, 1959 |

FOREIGN PATENTS

| | | |
|---|---|---|
| 762,586 | Great Britain | Nov. 28, 1956 |